Dec. 18, 1945.    D. C. HARVEY    2,391,157
SHUTTER RELEASE
Filed Jan. 4, 1944    2 Sheets-Sheet 1
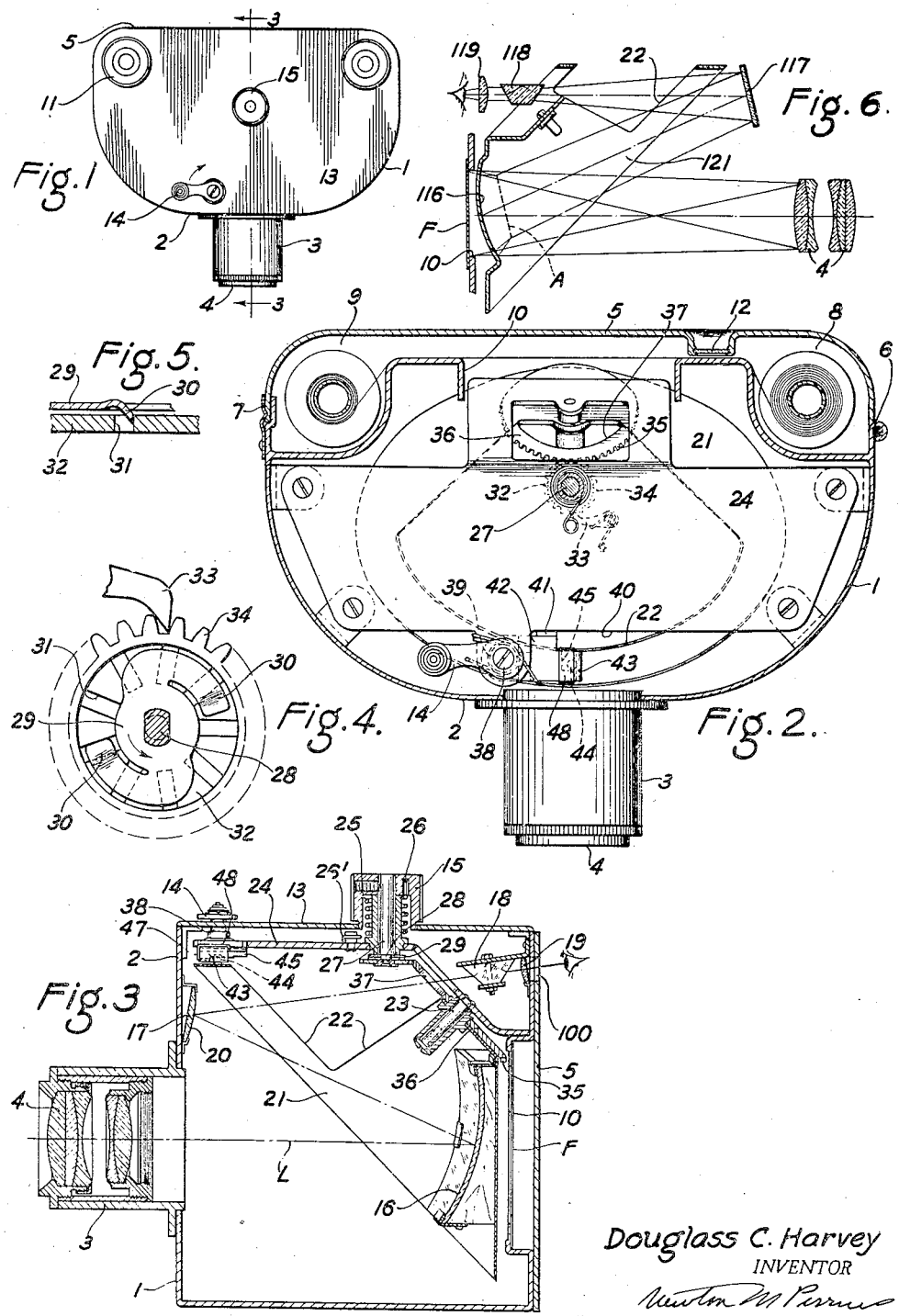
Douglass C. Harvey
INVENTOR
BY
ATTORNEYS Dec. 18, 1945.   D. C. HARVEY   2,391,157
SHUTTER RELEASE
Filed Jan. 4, 1944   2 Sheets-Sheet 2

Douglass C. Harvey
INVENTOR

BY
ATTORNEYS

Patented Dec. 18, 1945

2,391,157

UNITED STATES PATENT OFFICE 2,391,157

SHUTTER RELEASE

Douglass C. Harvey, Rochester, N. Y., assignor to Eastman Kodak Company, Rochester, N. Y., a corporation of New Jersey Application January 4, 1944, Serial No. 516,919

8 Claims. (Cl. 95—53)

This invention relates to photography and more particularly to a latch for camera shutters. One object of my invention is to provide a shutter release which is suitable for use in a shutter which moves in only one direction and which will hold the shutter parts in a fixed position before and after exposure in such a manner that the shutter may be tensioned. Another object of my invention is to provide a shutter release structure which requires only extremely light pressure on the shutter trigger to release the shutter. Another object of my invention is to provide a shutter with a releasing mechanism which operates smoothly and permits the shutter to function quietly and evenly. Other objects will appear from the following specification, the novel features being particularly pointed out in the claims at the end thereof.

Coming now to the drawings in which like reference characters denote like parts throughout:

Fig. 1 is a top plan view of a camera including a shutter release constructed in accordance with and embodying a preferred form of my invention;

Fig. 2 is an enlarged sectional view through the camera shown in Fig. 1, parts being shown in elevation;

Fig. 3 is an enlarged sectional view through the camera shown in Fig. 1 and taken on line 3—3 thereof;

Fig. 4 is an enlarged fragmentary detail of a portion of the spring tensioning device used for energizing the shutter;

Fig. 5 is a fragmentary detail section through a portion of the winding clutch shown in Fig. 4;

Fig. 6 is a schematic showing of a preferred form of optical system which may be used with a camera utilizing a shutter release constructed in accordance with my invention;

Figure 7:
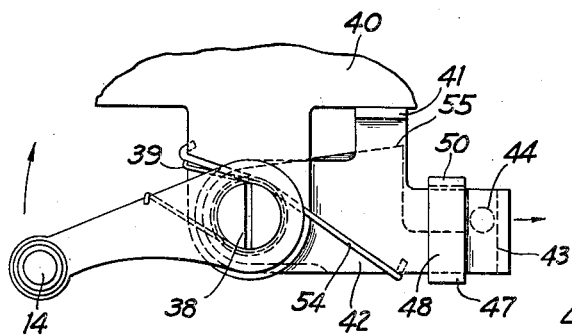
Fig. 7 is an enlarged top plan view of a portion of the shutter releasing mechanism, the parts being shown in a position they assumed before an exposure is made.

In shutters of the type in which a shutter mechanism, which may include one or more shutter leaves, swings through a circular path in one direction for making an exposure, it is desirable to provide a shutter release mechanism in which the shutter parts may always be held in a fixed position when not in use. To accurately repeat a predetermined time of exposure with a known type of spring, the spring must drive the shutter mechanism through exactly the same path each time the shutter operates. It is also desirable to have a shutter release mechanism which requires but little pressure on the trigger to release the shutter and to provide a shutter release which does not require any precautions on the part of the operator in operating the trigger in order to maintain exposures of the same duration.

One of the ways in which a shutter can be readily made to release with a very light pressure is to move an abutment away from a mechanism driving pin and my present invention is directed to such a release and especially to the provision of a means for replacing the abutment in the path of said pin before it completes its swing through its fixed path. In addition, I provide a cushioning means which not only brings the shutter mechanism to rest gently, but in addition reduces the noises which would otherwise occur when the rapidly moving pin strikes a stop.

A camera and shutter of the type in which my improved latch may be employed to advantage is shown in application, Serial No. 425,795, for Reflecting camera, in the name of Joseph Mihalyi, and filed January 6, 1942. As shown in this application, the camera body may consist of a box-like housing 1 including a front wall 2 supporting a lens mount 3 which may carry a suitable objective 4. The rear wall 5 of the camera may be hinged at 6 and may be provided with a latch 7 so that the camera back may be swung open to insert and remove film and film spools carried by a supply film spool chamber 8 and a take-up film spool chamber 9. An exposure frame 10 defining the size of the exposure may be provided between the film chambers 8 and 10. On the outside of the camera body 1 there may be a winding knob 11 of the usual type to move the film from the supply chamber 8 to the take-up chamber 9, and film numerals of the film backing paper may be viewed through the usual transparent window 12 covered by a red or green filter.

On the top wall 13 of the camera body 1, I prefer to place the shutter trigger 14 and a shutter tensioning knob 15. As indicated in Fig. 3, the objective 4 normally forms an image on a film F stretched across the exposure frame 10 while an exposure is being made. However, a concave reflector 16 normally lies between the exposure frame 10 and the objective 4, this reflector serving both as an image forming element and as a field element. In other words, the reflector 16 has sufficient power to form an aerial image indicated by the broken line A in Fig. 7 between the camera objective 4 and the exposure frame 10. This image lies comparatively close to the film and may be reviewed by the mirror 117, the erecting prism 118 and the eyepiece 119 when the shutter 121 is in the position shown in Fig. 7.

As also indicated in Fig. 3 the optical element 16 may be carried by a movable member 21 which in this instance is in the form of a truncated cone pivotally mounted on the post 23. A pin 44 carried by member 21 may swing through a circular path and, in this instance, a path of 360° each time an exposure is made.

A spring 25 furnishes power to the shutter, this spring being anchored at one end 26 to the winding knob 15 and being anchored at the other end 26' to the frame 24. There is a gear 29 on a stud 28 carried by the shaft 27. Gear 29 meshes with teeth 35 carried by the shutter member. Each time the knob 15 is turned to tension the spring 25, a pawl 33, ratchet 34 and a one-way clutch consisting of spaced spring pawls 30 and teeth 31 of the ratchet 34 place the spring 26 under tension. When the trigger 14 is depressed the shutter may swing through its path of movement and be caught by my improved type of latch mechanism after a single exposure has been made in a manner which will be set forth in detail hereinafter.

In Fig. 6 a modification of the camera shown in Fig. 3 is diagrammatically indicated. In this form the objective 4 is mounted on the camera 1 as in the first embodiment of my invention. A movable member or shutter 121 differs from the first-described embodiment since the optical element 116 may be formed directly from the metal of which the element 121 is made and, since the reflecting element 16 is concave and spherical in shape, it can be readily formed, polished and plated to give the desired results without adding the weight of a separate mirror 16 as indicated in Fig. 3.

Coming now particularly to my invention, best shown in Figs. 7 to 11 inclusive, the shutter trigger 14 operates a double latch mechanism for controlling the movement of the shutter mechanism 21 and its pin 44. The trigger 14 is attached to the shaft 38 and this shaft in turn carries a spring latch element 45. Each time the trigger 14 is turned in the direction shown by the arrow in Fig. 7 the spring latch element 45 turns with it. A plate 42 pivotally mounted on the shaft 38 constitutes a pivoted latch with its downwardly turned flange 43 so that this element normally lies in the path of the pin 44 of the shutter member 21. Consequently, when the parts are in the position shown in Figs. 7 and 8, the shutter pin 44 has a path which will intersect that of the flange 43 so that the pin 44 will either strike this flange or be held by it according to the position of the shutter plate 21.

Figure 9:
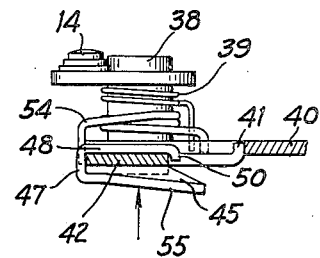
Fig. 9 is an enlarged sectional view taken on line 12—12 of Fig. 8.

In order to move the rigid pivoted latch element 42 from its pin holding position of Fig. 7 to release the pin 44 for movement in the direction shown by the arrow to make an exposure, I provide on the spring latch element 45 a second spring latch which may consist of a part of the spring latch 45 which is bent upwardly at 47 and which is bent across the rigid pivoted latch element 42. This spring latch element is provided with a downwardly extending latch element 50 engaging the pivoted latch 42 all as shown in Fig. 9. From this figure it will be apparent that when the parts are in the position shown, if the trigger 14 is moved, the pivoted latch 42 will be moved because of the downwardly turned lip 50 on the spring latch element 45. However, if the spring latch 45 should be pressed upwardly, as shown by the arrow in Fig. 9, the turned-over edge 50 would raise above the rigid latch element 42 and permit the spring 54 to move this latch element alone to its rest position as indicated in Fig. 11.

Figure 10:
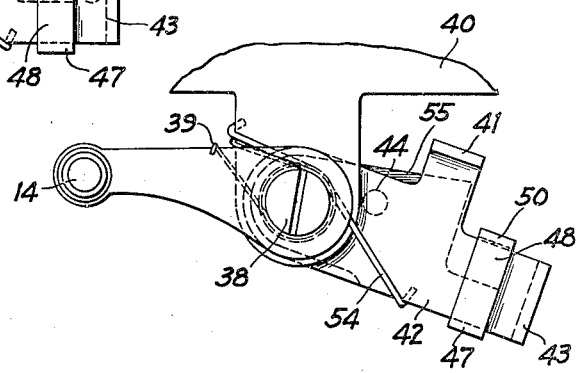
Fig. 10 is a view similar to Fig. 7 but with the parts shown in the position they assume after the shutter has been released and before the shutter reaches its position of rest.

The releasing action of the spring latch 45 just described takes place automatically in the following manner. Since the spring latch 45 has a downwardly-formed cam surface 55, and since this cam surface 55 never moves out of the path of pin 44 as indicated in Fig. 10, when the shutter release 14 has been actuated, the pin 44 swings through its path and upon nearly completing its path it will strike the cam 55 which accomplishes two useful functions.

Figure 8:
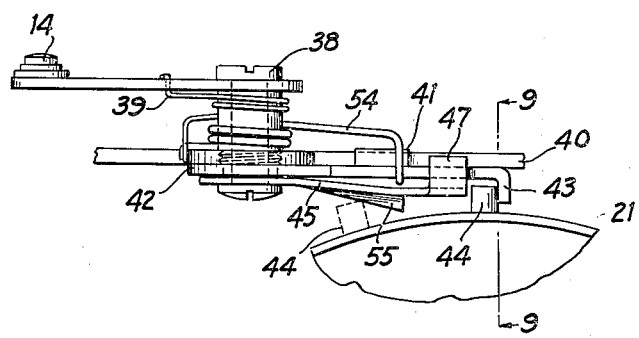
Fig. 8 is a front plan view of the mechanism shown in Fig. 7.
Figure 11:
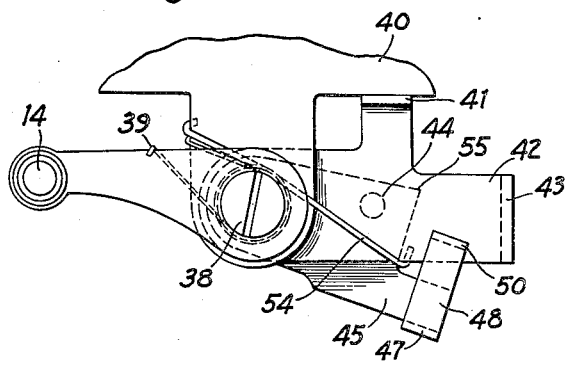
Fig. 11 is a view similar to Fig. 10 but with the parts in the position they assume just before an exposure is completed.

The first of these functions is that as the pin strikes the cam 55, as indicated in Fig. 8, the spring latch element 45 is moved upwardly by the pin 50 from the rigid latch element 52, thus permitting the spring 54 to swing this latch element 42 into its Fig. 11 position. Further movement of the pin 44, therefore, brings this pin up against the trigger latch element 43 and stops the shutter after it has completed one revolution. The second useful function that the spring latch 45 performs is that of bringing the shutter gently to rest. Since the shutter spring 25 drives the pin 44 quite rapidly the pin is moving at a relatively high speed when it strikes the cam 55. As this cam permits the pin to move under it most of this force on the spring actuating pin 44 is absorbed so that when pin 44 passes from beneath the flange 55 it is moving quite slowly and it will strike the stop 43 gently and with very little noise. In addition, of course, the spring cam 55 must slow up the pin 44 sufficiently to permit the released latch 42 to swing back to its Fig. 11 position before the pin reaches the flange 43.

By providing a comparatively light spring 39 (as shown in Fig. 6) for returning the trigger 14 to its rest position, it is necessary to overcome only very light pressure in operating the trigger 14. Consequently a shutter constructed as above described may be released very gently and without any liability of having the camera shake.

It should be particularly noticed that it is immaterial whether an operator presses the trigger 14 and releases it before an exposure is completed or whether he holds the trigger 14 in a released position, because irrespective of the position of the trigger 14 the spring cam 55 always lies in the path of the pin 44. Therefore, if the trigger is returned to its position of rest before the pin 44 completes its movement, the latch element flange 43 will already be positioned and the only function of the spring latch 55 will be to cushion the blow which would otherwise be struck by the pin 44 against the flange 43. However, if the operator should hold the trigger in its releasing position, as in Fig. 10, the pin 44 by striking the spring cam 45 would release the latch 50 and permit the rigid latch 42 to return to its Fig. 11 position thus stopping the pin when it reaches the flange. When in this position, if the trigger is released, its spring 29 (Fig. 6) will swing the spring latch 50 until it again engages the edge of the pivoted latch 42.

While I have described a preferred embodiment of my improved form of shutter latch mechanism and a typical shutter on which it may be mounted, it is obvious that the shutter mechanism itself may vary quite widely since my release mechanism is applicable to any shutter including the mechanism in which a pin moves in one direction through a fixed path for each exposure.

I claim:

1. A shutter release for shutters of the type including a shutter plate, a mount on which the shutter plate may move through a fixed path, mechanism for moving the shutter plate including a power spring, a pin movable with the shutter plate through a fixed path by the mechanism and spring, said shutter release comprising a pivotally-mounted latch element, a spring tending to hold said latch element in a position of rest engaging the pin at one end of its fixed path, a pivotally mounted trigger, a spring latch carried by the trigger, interengaging parts on the pivotally mounted latch and spring latch for normally moving the pivotally mounted latch with the trigger, a cam carried by the spring latch, said cam lying in the path of movement of the pin movable with the shutter plate, and adapted to be engaged and moved by the pin for releasing the interengaging parts of the pivoted and spring latch elements, whereby said pivoted latch element may be moved by its spring to its normal position of rest.

2. A shutter release for shutters of the type including a shutter plate, a mount on which the shutter plate may move through a fixed path, mechanism for moving the shutter plate including a power spring, a pin movable with the shutter plate through a fixed path by the mechanism and spring, said shutter release comprising a pivotally mounted latch element, a spring tending to hold said latch element in a position of rest engaging the pin, a pivotally mounted trigger, a spring latch carried by the trigger, interengaging parts on the pivotally mounted latch and on the spring latch for normally moving the pivotally mounted latch with the trigger, a cam carried by the spring latch, said cam lying in the path of movement of the pin movable with the shutter plate, and adapted to be engaged and moved by the pin for releasing the interengaging parts of the pivoted and spring latch elements, said cam being so shaped relative to the pin as to slow up the movement of said pin as it engages the cam and releases the interengaging parts of the spring and pivoted latch elements, thereby cushioning the blow of the pin against the latch element.

3. A shutter release for shutters of the type including a shutter plate, a mount on which the shutter plate may move through a fixed path, mechanism for moving the shutter plate including a power spring, a pin movable with the shutter plate through a fixed path by said mechanism and spring, said shutter release comprising a pivotally mounted latch element, a spring tending to hold said latch element in a position of rest engaging the pin, a pivotally mounted trigger, a shaft on which the trigger is mounted, said shaft constituting the pivotal mount on which the pivotally mounted latch may freely turn, a spring latch carried by the trigger, interengaging parts on the pivotally mounted latch and spring latch for normally moving the pivotally mounted latch with the trigger and spring latch about the shaft, a cam carried by the spring latch, said cam lying in the path of movement of the pin movable with the shutter plate, and adapted to be engaged and moved by the pin moving through its path for releasing the interengaging parts of the pivoted and spring latch elements whereby said pivoted latch element may swing about the trigger shaft and independently of the trigger and may be moved by its spring to its normal position of rest.

4. A shutter release for shutters of the type including a shutter plate, a mount on which the shutter plate may turn through a fixed path, mechanism for moving the shutter plate including a power spring, a pin carried by the shutter plate and movable therewith through a fixed path, said shutter release comprising a pivotally mounted latch element including a downwardly extending pin engaging flange, a spring tending to hold said latch element in a position of rest with the flange engaging the pin when at one end of its fixed path, a pivotally mounted trigger, a spring latch carried by the trigger, interengaging parts on the pivotally mounted latch and spring latch for normally moving the latch elements with the trigger, a cam carried by the spring latch, said cam lying in the path of movement of the pin carried by the shutter plate, and adapted to be engaged and moved by the pin for releasing the interengaging parts of the pivoted and spring latch elements, whereby said pivoted latch element may be moved by its spring to its normal position of rest with the pin engaging the downwardly extending flange of the pivotally mounted latch element.

5. In a camera shutter, the combination with a shutter plate, a pivotal mount on which said shutter plate may swing in one direction, a spring for swinging said shutter plate, a mechanism for tensioning said spring, a pin carried by said shutter plate and movable therewith through a circular path, a trigger, a latch pivotally mounted and spring pressed into a position to engage said pin, a spring latch normally engaging the pivoted latch for moving the pivoted latch by the trigger when releasing the pin, and means carried by the spring latch and lying in the path of movement of the pin for releasing the pivotally mounted latch from its normal engagement with the spring latch by the moving of said pin through its circular path of movement, whereby said latch may return under the impulse of its spring to a position to engage said pin.

6. In a camera shutter, the combination with a shutter plate, a pivotal mount on which said shutter plate my swing in one direction, spring means for swinging said shutter plate, a mechanism for tensioning the spring, a pin carried by the shutter plate and movable therewith through a circular path, a trigger, a latch pivotally mounted and spring pressed into a position to normally engage said pin, a spring latch normally engaging the pivoted latch for moving the pivoted latch by the trigger for releasing the pin, and means carried by the spring latch and lying in the path of movement of the pin for releasing the pivotally mounted latch from its normal position engaging the spring latch by said pin swinging through its circular path, whereby said latch may return under the impulse of its spring to a position to engage said pin, said means for releasing the pivotally mounted latch including a shock absorber for slowing up the movement of said pin and enabling the released pivotally mounted latch to move to a position to engage said pin in time to catch said moving pin after an exposure-making movement.

7. In a camera shutter, the combination with a shutter plate, a pivotal mount on which said shutter plate may turn in one direction, a spring for turning said shutter plate, a mechanism for tensioning said spring, a pin carried by said shutter plate and movable therewith through a circular path, a trigger, a latch pivotally mounted and spring-pressed into a position to engage the pin, a spring latch normally engaging the pivotally mounted latch for moving the pivotally mounted latch by the trigger for releasing the pin, and means carried by the spring latch and lying in the path of movement of the pin for releasing the pivotally mounted latch from its normal spring latch engaging position, by the pin moving with the shutter plate through its circular path, whereby said latch may return under the impulse of its spring to a position to engage the pin, said means including a spring cam of a size to lie in the path of movement of the pin regardless of the position of the shutter trigger.

8. In a camera shutter, the combination with a shutter plate, of a pivotal mount on which said shutter plate, mechanism for tensioning said spring, a pin carried by said plate and movable therewith through a circular path, a trigger, a latch pivotally mounted and spring pressed into a position to engage said pin, a spring latch having a normal position engaging the pivoted latch for moving the pivoted latch by the trigger for releasing the pin, and means carried by the spring latch and lying in the path of movement of the pin for releasing the pivotally mounted latch from its normal position engaging the spring latch by the pin moving with the shutter plate through its circular path of movement whereby said latch may return under the impulse of its spring to a position to engage said pin, said means comprising a spring latch arm having an angularly disposed flange extending across the path of movement of the pin in all positions of the trigger, and positioned to be engaged and moved by the pin as it swings with the shutter in making an exposure.

DOUGLASS C. HARVEY.